US008812600B1

(12) United States Patent
McGuirk et al.

(10) Patent No.: US 8,812,600 B1
(45) Date of Patent: Aug. 19, 2014

(54) SENDING OUT-OF-BAND INSTANT MESSAGES FROM A GAME NETWORKING SYSTEM

(75) Inventors: Jason McGuirk, San Mateo, CA (US); Jason Davidson, Sooke (CA); Michael Martinez, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 5 days.

(21) Appl. No.: 13/077,722

(22) Filed: Mar. 31, 2011

(51) Int. Cl.
*G06F 15/16* (2006.01)
(52) U.S. Cl.
USPC ........................................ 709/206; 705/14.12
(58) Field of Classification Search
None
See application file for complete search history.

(56) References Cited

U.S. PATENT DOCUMENTS

| 7,455,590 | B2* | 11/2008 | Hansen et al. | 463/40 |
| 2005/0064939 | A1* | 3/2005 | McSheffrey et al. | 463/42 |
| 2007/0266097 | A1* | 11/2007 | Harik et al. | 709/204 |
| 2008/0090659 | A1* | 4/2008 | Aguilar et al. | 463/42 |
| 2008/0243853 | A1* | 10/2008 | Reding et al. | 707/9 |
| 2009/0069079 | A1* | 3/2009 | Britt et al. | 463/25 |
| 2010/0248843 | A1* | 9/2010 | Karsten | 463/43 |
| 2010/0312831 | A1* | 12/2010 | Xie et al. | 709/204 |
| 2011/0250949 | A1* | 10/2011 | van Os et al. | 463/25 |
| 2012/0122588 | A1* | 5/2012 | Berger et al. | 463/42 |
| 2012/0202587 | A1* | 8/2012 | Allen et al. | 463/25 |
| 2012/0225720 | A1* | 9/2012 | Baszucki | 463/42 |

* cited by examiner

*Primary Examiner* — Yves Dalencourt
*Assistant Examiner* — Clayton R Williams
(74) *Attorney, Agent, or Firm* — Schwegman Lundberg & Woessner, P.A.

(57) ABSTRACT

In a method and system of sending an out-of-band instant message from a game networking system, an instant messaging system is accessed from the game networking system to send the out-of-band instant message to a friend of the user on behalf of the user, with the out-of-band instant message pertaining to the game networking system.

20 Claims, 8 Drawing Sheets

SENDING OUT-OF-BAND INSTANT MESSAGES FROM A GAME NETWORKING SYSTEM

TECHNICAL FIELD

The present application relates generally to the technical field of instant messaging, and, in one specific example, to accessing an instant messaging system from a game networking system to send out-of-band instant messages to a user of the game networking system or friends of the user.

BACKGROUND

In many games, there is a virtual world or some other imagined playing space where a player/user of the game controls one or more player characters (herein "character" or "player character."). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and even more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Mozilla Firefox®, Google Chrome®, Microsoft Internet Explorer®).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in a online poker tournament, and so forth.

BRIEF DESCRIPTION OF THE DRAWINGS

Some embodiments are illustrated by way of example and not by way of limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In a method and system of sending an out-of-band instant message from a game networking system, an instant messaging system is accessed from the game networking system to send the out-of-band instant message to a friend of a user, on behalf of the user, with the out-of-band instant message pertaining to the game networking system.

Figure 1:
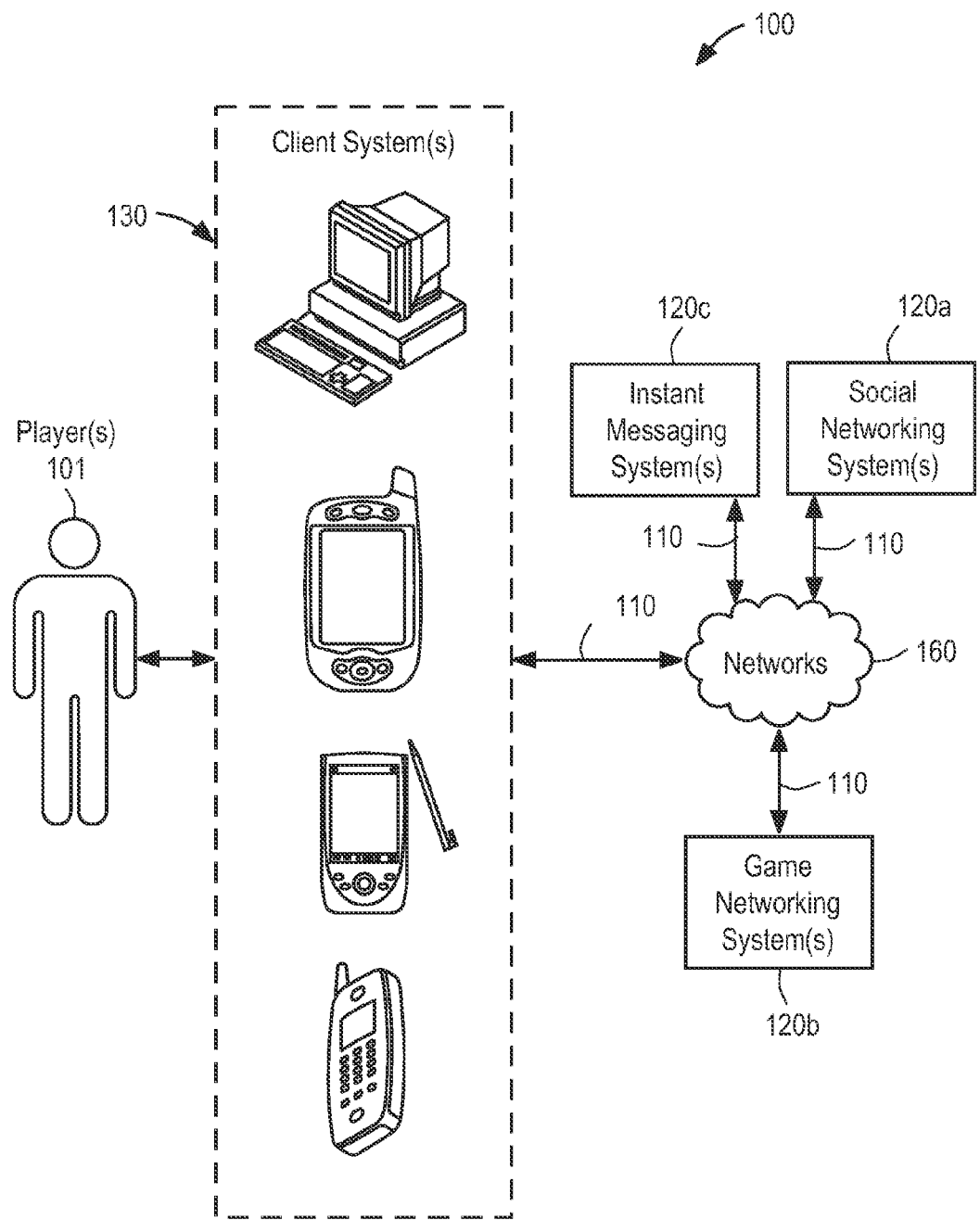
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises player 101, social networking system 120a, game networking system 120b, instant messaging system 120c, client system 130, and networks 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120*a* is a network-addressable computing system that can host one or more social graphs. Social networking system 120*a* can generate, store, receive, and transmit social networking data. Social networking system 120*a* can be accessed by the other components of system 100 either directly or via network 160. Game networking system 120*b* is a network-addressable computing system that can host one or more online games. Game networking system 120*b* can generate, store, receive, and transmit game-related data, such as, for example, game account data, game input, game state data, and game displays. Game networking system 120*b* can be accessed by the other components of system 100 either directly or via network 160. Instant messaging system 120*c* is a network-addressable computing system that can send instant messages between users of the instant messaging system 120*c*. The instant messaging system 120*c* may be part of another system (e.g., the social networking system 120*a*) or be independent of other systems. Like the social networking system 120*a*, the instant messaging system 120*c* can also host one or more social graphs and generate, store, receive, and transmit social networking data. Social networking system 120*a* can be accessed by the other components of system 100 either directly or via network 160. Player 101 may use client system 130 to access, send data to, and receive data from social networking system 120*a*, game networking system 120*b*, and instant messaging system 120*c*. Client system 130 can access social networking system 120*a*, game networking system 120*b*, or instant messaging system 120*c* directly, via network 160, or via a third-party system. As an example and not by way of limitation, client system 130 may access game networking system 120*b* via social networking system 120*a*. As another example and not by way of limitation, game networking system 120*b* may access instant messaging system 120*c* or social networking system 120*a* on behalf of player 101 (e.g., to send an instant message or post a message on a wall). Client system 130 can be any suitable computing device, such as a personal computer, laptop, cellular phone, smart phone, computing tablet, and the like.

Although FIG. 1 illustrates a particular number of players 101, social networking systems 120*a*, game networking systems 120*b*, instant messaging systems 120*c*, client systems 130, and networks 160, this disclosure contemplates any suitable number of players 101, social networking systems 120*a*, game networking systems 120*b*, instant messaging systems 120*c*, client systems 130, and networks 160. As an example and not by way of limitation, system 100 may include one or more game networking systems 120*b* and no social networking systems 120*a*. As another example and not by way of limitation, system 100 may include a system that comprises social networking system 120*a*, game networking system 120*b*, and instant messaging system 120*c*. As another example and not by way of limitation, system 100 may include a system that comprises game networking system 120*b* and one or more instant messaging systems 120*c*. Moreover, although FIG. 1 illustrates a particular arrangement of player 101, social networking system 120*a*, game networking system 120*b*, instant messaging system 120*c*, client system 130, and network 160, this disclosure contemplates any suitable arrangement of player 101, social networking system 120*a*, game networking system 120*b*, instant messaging system 120*c*, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120*a*, game networking system 120*b*, instant messaging system 120*c*, client system 130, and network 160, this disclosure contemplates any suitable connections between player 101, social networking system 120*a*, game networking system 120*b*, instant messaging system 120*c*, client system 130, and network 160. As an example and not by way of limitation, in particular embodiments, client system 130 may have a direct connection to social networking system 120*a*, game networking system 120*b*, or instant messaging system 120*c*, thereby bypassing network 160.

Online Games and Game Systems
Game Networking Systems

In an online computer game, a game engine manages the game state of the game. The game state comprises all game play parameters, including player character state, non-player character (NPC) state, in-game object state, game world state (e.g., internal game clocks, game environment), and other game play parameters. Each player 101 controls one or more player characters. The game engine controls all other aspects of the game, including NPCs and in-game objects. The game engine also manages game state, including player character state for currently active (online) and inactive (offline) players.

An online game can be hosted by game networking system 120*b*, which can be accessed using any suitable connection with a suitable client system 130. A player may have a game account on game networking system 120*b*, wherein the game account can contain a variety of information associated with the player (e.g., the player's personal information, financial information, purchase history, player character state, game state, etc.). In some embodiments, a player may play multiple games on game networking system 120*b*, which may maintain a single game account for the player with respect to all the games, or multiple individual game accounts for each game with respect to the player. In some embodiments, game networking system 120*b* can assign a unique identifier to each player 101 of an online game hosted on game networking system 120*b*. Game networking system 120*b* can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120*a*, game networking system 120*b*, or instant messaging system 120*c*). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems Social Networks, and Social Graphs

In an online multiplayer game, players may control player characters and a game engine controls NPCs and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as anon-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's player character and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friend, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 120a, game networking system 120b, or instant messaging system 120c). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, the social graph is part of a instant messaging system 120c managed by a third party (e.g., America Online Instant Messenger (AIM), Blauk, eBuddy, Facebook messenger, Gadu-Gadu, IBM Lotus Sametime, ICQ, IMVU, Meebo, MXit, Paltalk, Skype, Tencent QQ, VZOchat, Windows Live Messenger, Xfire, and Yahoo! Messenger). In yet other embodiments, player 101 has a social network on social networking system 120a, game networking system 120b, and instant messaging system 120c, wherein player 101 can have a social network on the game networking system 120b that is a subset, superset, or independent of the player's social networks on social networking system 120a or instant messaging system 120c. In such combined systems, game networking system 120b can maintain social graph information with edge type attributes that indicate whether a given friend is an "in-game friend," an "out-of-game friend," or both. The various embodiments disclosed herein are operable when the social graph is managed by any combination of social networking system 120a, game networking system 120b, and instant messaging system 120c.

Figure 2:
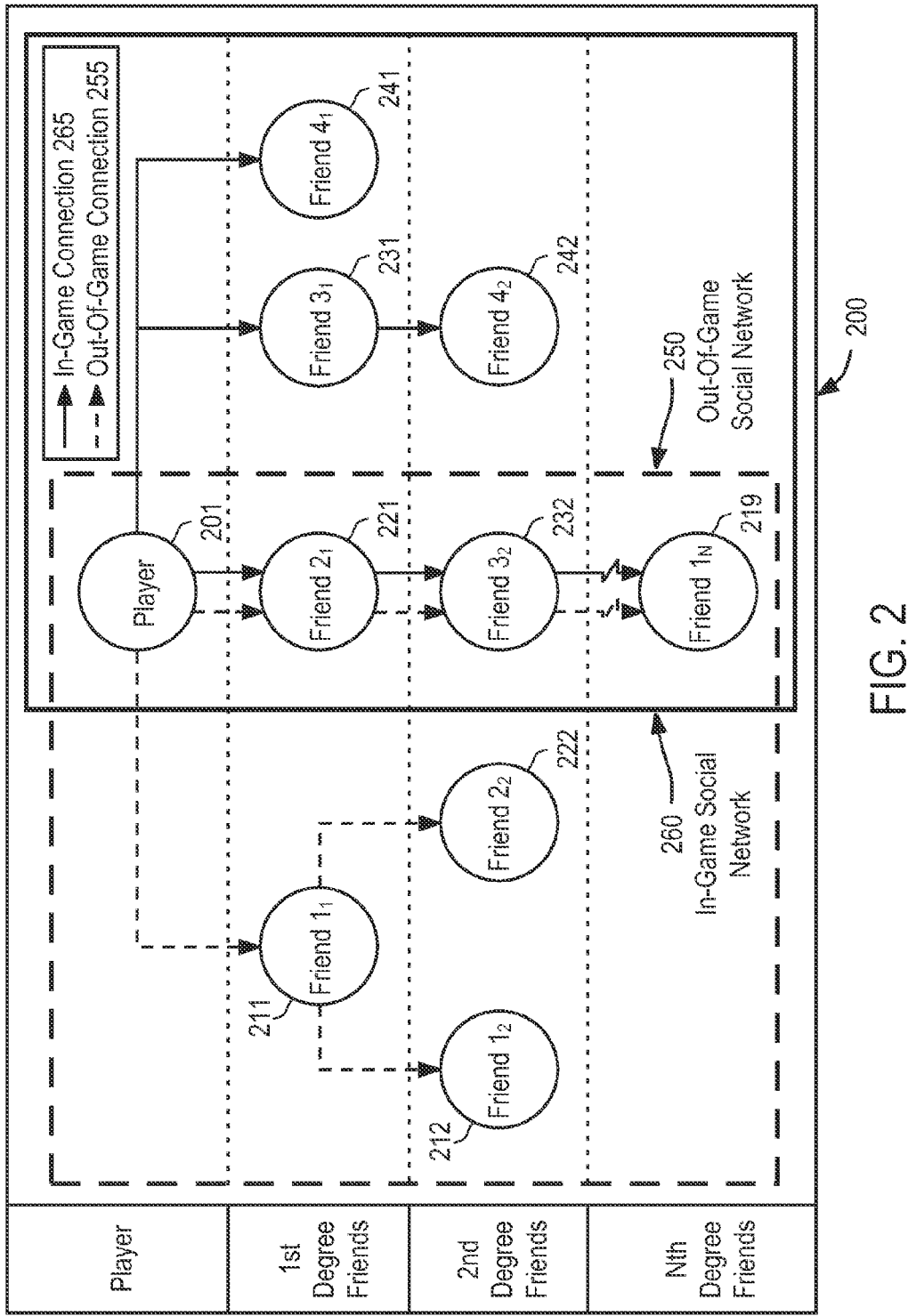
FIG. 2 is a block diagram illustrating an example of a social network 200 within a social graph.

FIG. 2 is a block diagram illustrating an example of a social network 200 within asocial graph. As shown, Player 201 can be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to whom he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a or instant messaging system 120c.

In various embodiments, Player 201 can have Nth-degree friends connected to him through a chain of intermediary degree friends, as indicated in FIG. 2. For example, Nth-degree Friend $1_N$ 219 is connected Player 201 via second-degree Friend $3_2$ 232 and one or more other higher-degree friends. Various embodiments may utilize the distinction between the various degrees of friendship relative to Player 201.

In particular embodiments, a player (or player character can have a social graph within an online multiplayer game that is maintained by the game engine and another social graph maintained by a separate social networking system or a separate instant messaging system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260, and friend $4_2$ 242 is a second-degree friend with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access an in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Game Systems

A game event may be an outcome of an engagement, a provision of access, rights and/or benefits, or the obtaining of some assets health, money, strength, inventory, land, etc.). A game engine determines the outcome of a game event according to a variety of factors, such as the game rules, a player character's in-game actions, player character state, game state, interactions of other player characters, and random calculations. Engagements can include simple tasks (e.g., planting a crop, cleaning a stove), complex tasks (e.g., building a farm or business, running a café), or other events.

Figure 8:
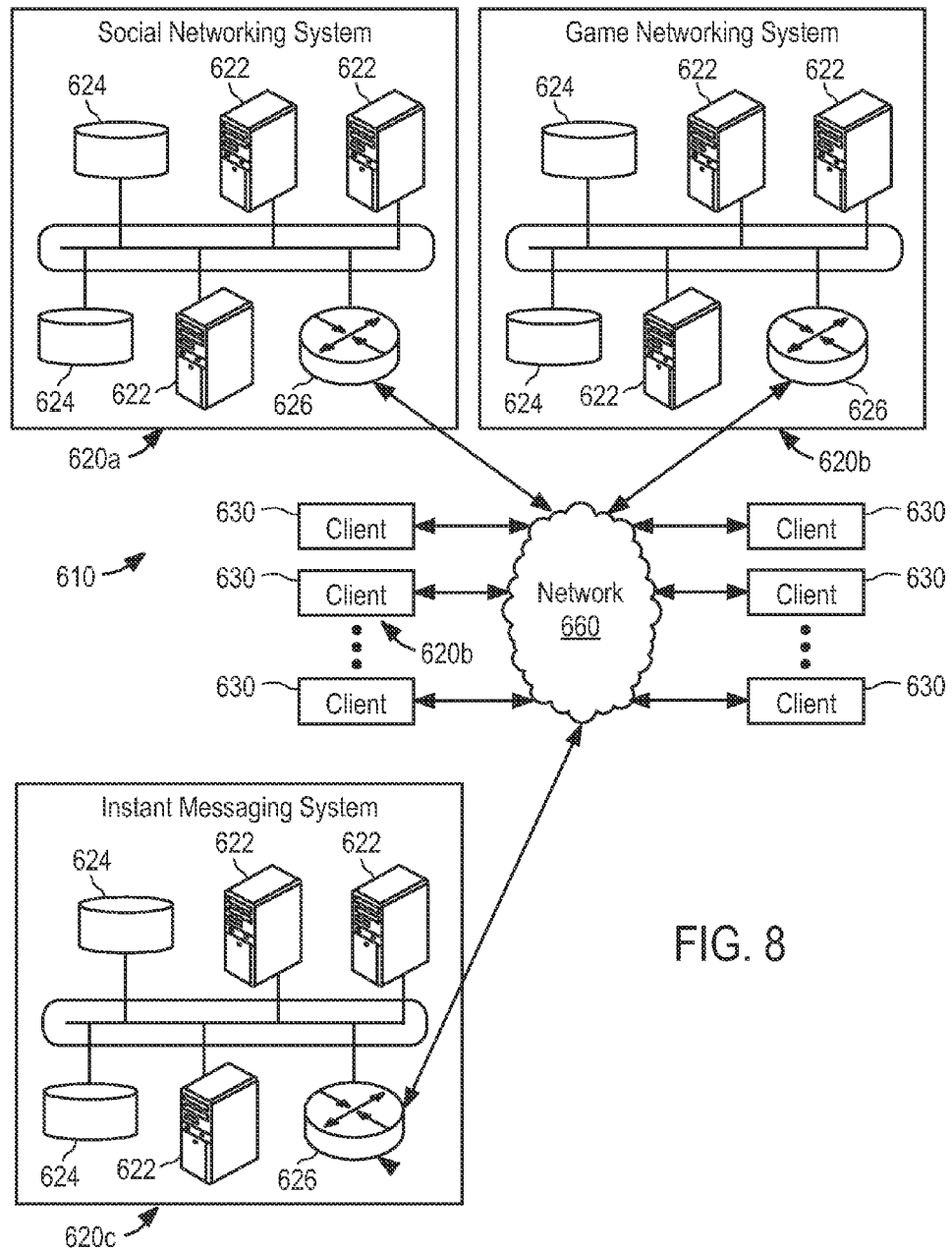
FIG. 8 is a block diagram illustrating an example network environment 610, in which various example embodiments may operate.

An online game can be hosted by a game networking system 620b of FIG. 8, which can be accessed over any suitable network with an appropriate client system 630. A player may have a game system account on game networking system 620b, wherein the game system account can contain a variety of information about the player (e.g., the player's personal information, player character state, game state, etc.). In various embodiments, an online game can be embedded into a third-party website. The game can be hosted by the networking system of the third-party website, or it can be hosted on game networking system 620b and merely accessed via the third-party website. The embedded online game can be hosted solely on a server of game networking system 620b or using a third-party vendor server. In addition, any combination of the functions of the present disclosure can be hosted on or provided from any number of distributed network resources. For example, one or more executable code objects that implement all or a portion of the game can be downloaded to a client system for execution.

Virtual Currency

In various embodiments, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some embodiments, virtual currency can be used to purchase one or more in-game assets or other benefits. For example, a player may be able to exchange virtual currency for a desired level, access, right, or item in an online game. In one embodiment, legal currency can be used to directly purchase an in-game asset or other benefit. The player can select the desired in-game asset or other benefit. Once appropriate selections are made, the player can place the order to purchase the in-game asset or other benefit. This order is received by the game networking system 620b, which can then process the order. If the order is processed successfully, an appropriate financial account associated with the player can be debited by the amount of virtual currency or legal currency needed to buy the selected in-game asset or other benefit.

In some embodiments, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

Instant Messaging

Figure 3:
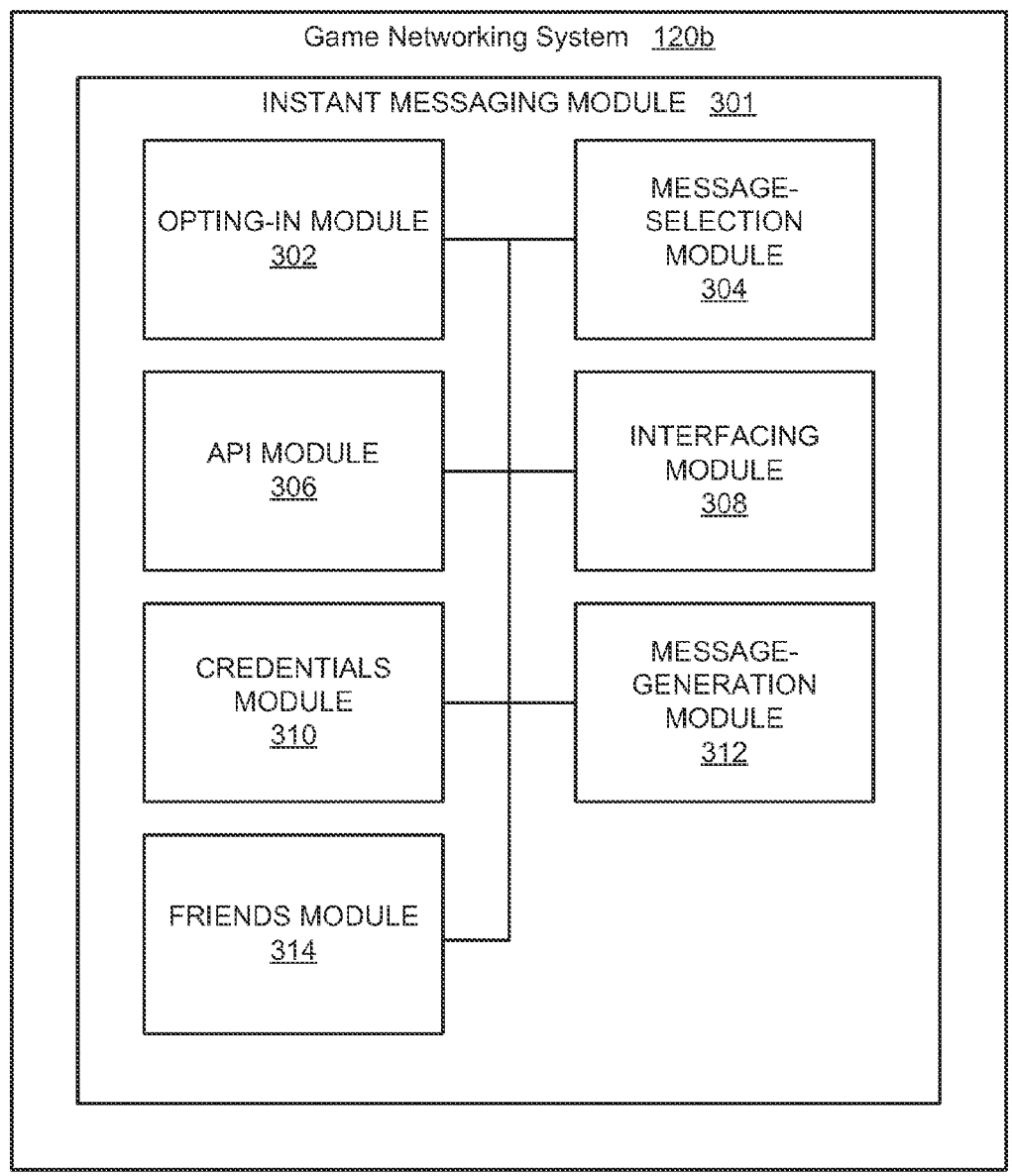
FIG. 3 is a block diagram illustrating example modules of a game networking system related to handling instant messaging communications pertaining to players of a game.

FIG. 3 is a block diagram illustrating example modules of the game networking system 120b related to handling instant messaging communications pertaining to players 101. The game networking system 120b includes an instant messaging module 301 that is configured to handle the instant messaging communications. The instant messaging module 301, in turn, includes various modules 302-314. An opting-in module 302 is configured to enable players 101 to opt-in to (or opt-out of) receiving instant messages from the game networking system 120b (e.g., via an out-of-band or out-of-game instant messaging system such as instant messaging system 120c). As part of the opting-in process, the opting-in module 302 may receive account names from the players 101 that identify the players within the instant messaging systems 120c.

A message-selection module 304 is configured to select particular messages generated by the game networking system 120b for transmitting as instant messages (e.g., in addition to or instead of for transmitting as other message types, such as wall postings, blog postings, email messages, notifications, or requests (e.g., sent via the social networking system 120a)) based on various criteria. For example, the message-selection module 304 may select a message for transmitting as an instant message based on a level of urgency of the message. As another example, the message-selection module 304 may select a message for transmitting as an instant message based on current or past activity levels with respect to the game networking system 120b of players 101 to which the message pertains.

An API module 306 is configured to expose the functionality of the instant messaging module 301 to one or more computer-implemented games executing on the game networking system 120b via one or more application program interfaces (APIs). An interfacing module 308 is configured to interface with one of more instant messaging systems 120c to manage the sending or receiving of instant messages to or from players 101 or the sending or receiving of instant messages to or from friends of the players 101 on behalf of the players 101 via the instant messaging system 120c. The interfacing module 308 may be implemented such that it is capable of interfacing with any instant messaging system 120c independent of its underlying technology (e.g., AIM, Windows Live Messenger, or Yahoo! Messenger) to handle the instant messaging communications. For example, the interfacing module 308 may use APIs provided by the instant messaging systems 120c or control puppet clients of the instant messaging systems 120c. The interfacing module 308 may provide a user interface that enables players 101 to access functionalities of the instant messaging systems 120c within a game executing on the game networking system 120b. For example, the interfacing module 308 may provide a chat window within a game that enables players 101 to communicate with friends via instant messaging systems 120c without leaving the context of the game.

The credentials module 310 may obtain credentials (e.g., user name and password) that the players 101 use to access the instant messaging systems 120c from the players 101. The credentials module 310 may share the credentials with the interfacing module 308 (e.g., to enable the interfacing module 308 to use clients of the instant messaging systems 120c as puppet clients or to otherwise access the instant messaging systems 120c on behalf of the players 101).

The message-generation module 312 may generate one or more messages (e.g., notifications or requests) to be sent as instant messages to the players 101. For example, the message-generation module 312 may generate welcome messages to welcome players 101 when they sign up or join the game networking system 120b, challenge messages when players 101 initiate or participate in a challenge with respect to computer-implemented games executing on the game networking system 120b, feature messages when new features (e.g., of the game networking system 120b or the computer-implemented games executing on the game networking system 120b) are made available to players 101, status messages (e.g., updates when friends of players 101 are playing a computer-implemented game executing on the game networking system 120b), or reactivation messages to incentivize players to reactivate or increase their activity with respect to the game networking system 120b.

The message-generation module 312 may also generate one or more requests that the players 101 or friends of players 101 perform an action with respect to the game networking system 120b or a computer-implemented game executing on the game networking system 120b. For example, the message-generation module 312 may generate a request message requesting that one of the players 101 claim chips sent within a computer-implemented poker game executing on the game networking system 120b to the players 101 from one of the friends of the player 101. The request may include one or more incentives (e.g., in-game rewards) to be provided to the players 101 in exchange for the players 101 performing the action.

The message-generation module 312 may incentivize the players 101 to engage the message-generation module 312 to generate instant messages. For example, the message-generation module 312 may offer in-game assets to the players 101 or the friends of the players 101 in exchange for their permission to send or receive instant messages to players 101 or friends of players 101 from the game networking system 120b (e.g., via the interfacing module 308), or in exchange for the players 101 initiating requests to send instant messages to friends of the players 101.

Because in various embodiments the instant messaging system 120c is operated by a third party independently of the game networking system 120b, the players 101 may receive instant messages generated by the game networking system 120b via the instant messaging system 120c regardless of whether the players 101 are currently accessing the game networking system 120b.

The friends module 314 may determine friends of the players 101 with respect to the instant messaging systems 120c. For example, the friends module 314 may use the credentials provided by one of the players 101 (e.g., via the credentials module 310) to access lists of friends of the player maintained by the player within one or more of the instant messaging systems 120c. The friends module 314 may identify one or more friends of a player maintained by the player within the instant messaging system 120c as corresponding to one or more in-game friends of the player. The friends module 314 may also identify one or more of the friends of the player maintained by the player within the instant messaging system 120c as corresponding to one or more out-of-game friends of the player.

The friends module 314 may select one or more friends of the players 101 as targets for sending one or more generated messages as instant messages. The selection may be based on various factors, including the type of the generated messages, how recently the friend last received an instant message from the game networking system 120b, whether the friend opted-in (e.g., via the opting-in module 302) to receiving instant message from the game networking system 120b, or whether the friend is an out-of-game friend or an in-game friend. For example, if a friend is an in-game friend of the player and the friend has opted-in to receiving messages from the game networking system 120b, the friends module 314 may select the friend to receive instant messages pertaining to activities of the player within the game. As another example, if the friend is an out-of-game friend of the player, the friends module 314 may select the friend to receive an instant message on behalf of the player that provides an incentive for the friend to play a game with the player) or become an in-game friend of the player.

By accessing lists of friends maintained by the players 101 within multiple systems (e.g., a combination of the social networking systems 120a, the game networking system 120b, and instant messaging system 120c), the friends module 314 may determine information about relationships between the players 101 and their friends, including in-game and out-of-game friends, with more accuracy than if the friends module 314 was only able to access lists of friends from one of the multiple systems. The information that the friends module 314 may be able to determine with greater accuracy includes strengths of the relationships, types of the relationships (e.g., business or casual), or communication mechanisms that are most appropriate for communicating with the friends of the players 101 (e.g., instant messaging, email, or wall postings).

Additionally, by accessing lists of friends maintained by the players 101 within multiple systems, the friends module 314 may be able to determine more complete master lists of the friends of the players 101. As part of maintaining such master lists of the friends of the players 101, the friends module 314 may maintain associations between the various accounts of the players 101 or the friends of the players 101 maintained at the multiple systems. Such associations may include a linking of the identifiers (IDs) (e.g., login IDs) used by each of the players 101 or the friends of the players 101 each of the multiple systems. The friends module 314 may base selections of the friends of the players 101 for receiving instant messages on any information the friends module 314 derives from the multiple systems regarding the friends of the players 101.

The friends module 314 may enable players 101 to offer an in-game asset (e.g., via the message-generation module 312 or the interfacing module 308) to in-game or out-of-game friends regardless of whether such friends are friends of the players 101 with respect to the social networking systems 120a, the game networking system 120b, the instant messaging systems 120c, or a combination of such systems.

Figure 4:
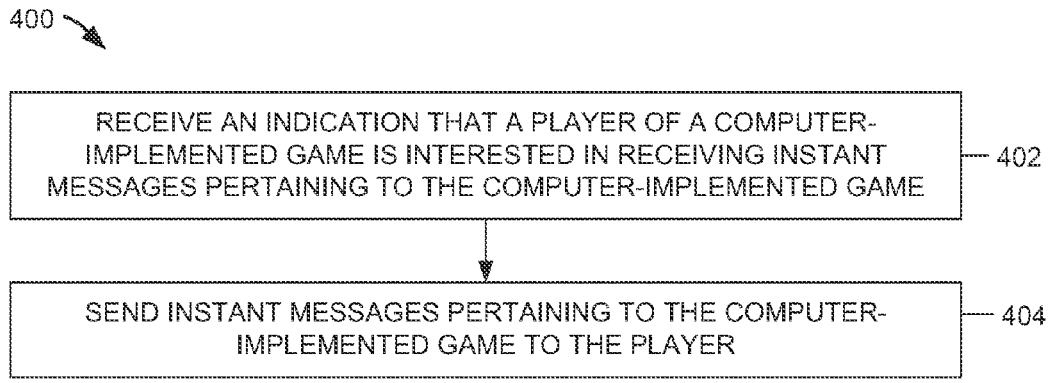
FIG. 4 is a flowchart illustrating an example method of sending out-of-band instant messages from a game networking system.

FIG. 4 is a flowchart illustrating an example method 400 of sending out-of-band instant messages from the game networking systems 120b. At operation 402, the opting-in module 302 receives an indication that the user is interested in receiving instant messages pertaining to a computer-implemented game executing on the game networking system 120b. At operation 404, the interfacing module 308 sends instant messages pertaining to the computer-implemented game to the user. For example, the interfacing module 308 interfaces with instant messaging system 120c to send an out-of-band instant message pertaining to the computer-implemented game to the user independently of whether the user is currently accessing the computer-implemented game. The instant message may be a message that is generated by the message-generation module 312 or selected by the message-selection module 304 for delivery to the user as an instant message. The instant message may also pertain generally to the game networking system 120b itself rather than a particular computer-implemented game executing on the game networking system 120b.

Figure 5:
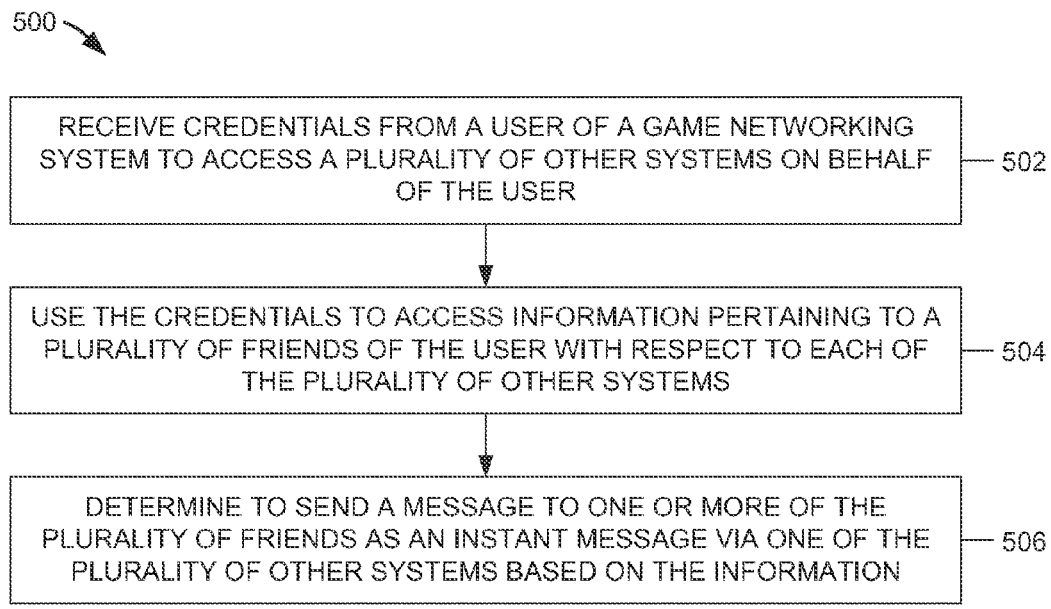
FIG. 5 is a flowchart illustrating an example method of sending out-of-band instant messages from a game networking system.

FIG. 5 is a flowchart illustrating an example method 500 of sending out-of-band instant messages from the game networking system 120b. At operation 502, the credentials module 310 receives credentials from a user (e.g., one of the players 101) of the game networking system 120b to access a plurality of other systems on behalf of the user. The other systems may include the social networking systems 120a or the instant messaging systems 120c. The credentials may include login IDs and passwords that the user uses to access the other systems. At operation 504, the interfacing module 308 uses the credentials to access information pertaining to a plurality of friends of the user with respect to each of the other system. At operation 506, the friends module 314 determines to send a message (e.g., via the interfacing module 308) to one or more of the plurality of friends of the user based on the information. For example, the friends module may determine to send an instant message to a friend of the user based on various factors, such as the strength of the relationship between the friend and the user, whether the friend is a user of the game networking system 120b, or whether the friend has opted in to receiving instant messages from the game networking system 120b.

Figure 6:
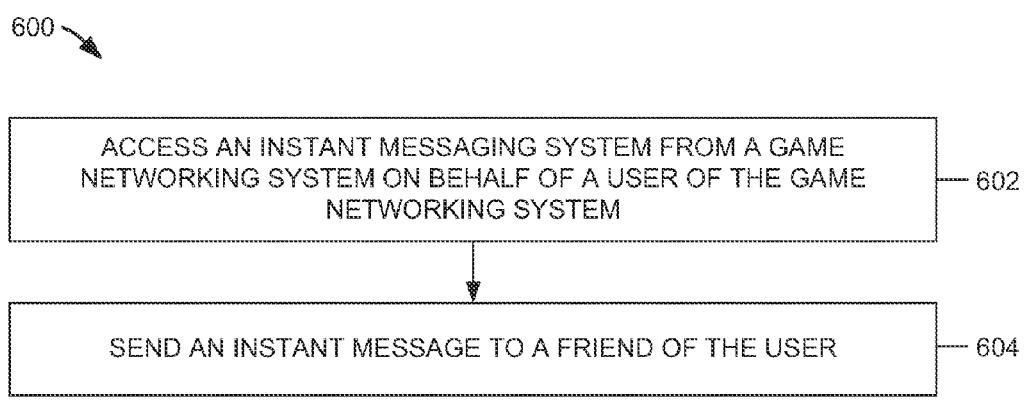
FIG. 6 is a flowchart illustrating an example method of sending out-of-band instant messages from a game networking system.

FIG. 6 is a flowchart illustrating an example method 600 of sending out-of-band instant messages from the game networking system 120b. At operation 602, the interfacing module 308 accesses the instant messaging system 120c on behalf of the user. The accessing may be in response to an opting-in by the user that includes permission from the user for the game networking system 120b to send instant messages to the friends of the user (e.g., via the opting-in module 302) or in response to a receiving of credentials from the user to access the instant messaging system 120b on behalf of the user. At operation 604, the interfacing module 308 sends an instant message to a friend of the user. The instant message may pertain to an action of the user with respect to the game networking system 120b. For example, the message may indicate that the user logged in or logged out from the game networking system 120b. The message may pertain to an action that the user performed with respect to a computer-implemented game that is executing on the game networking system 120b. The message may be a request sent on behalf of the user that the friend perform an action with respect to the game networking system 120b (e.g., that the friend assist the user in a completion of a task associated with a game executing on the game networking system 120b). The message may offer an incentive for the friend of the user to join or otherwise participate in a game executing on the game networking system 120b.

Game Interfaces

In various embodiments, a user 101 of a client system 630 can use a browser client (e.g., Firefox, Chrome, Internet Explorer, etc.) to access the online game over the Internet (or other suitable network). A game interface may be automatically generated and presented to the user in response to the user visiting or accessing the game operator's website or a third-party's website from client system 130 with a browser client. Game networking system 120b can transmit data to client system 130, thereby allowing it to display the game interface, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. The game interface is configured to receive signals from the user 101 via client system 130. For example, the user 101 can click on the game interface or enter commands from a keyboard or other suitable input device. The game engine can respond to these signals to allow game play. The display of the game interface can change based on the output of the game engine, the input of the player, and other signals from game networking system 120b and client system 130.

The game interface can display various game components, such as the game environment, options available to the player (e.g., in-game actions, preferences, settings, etc.), game results, and so forth. Some components of the game interface may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to the game interface.

Data Flow

Figure 7:
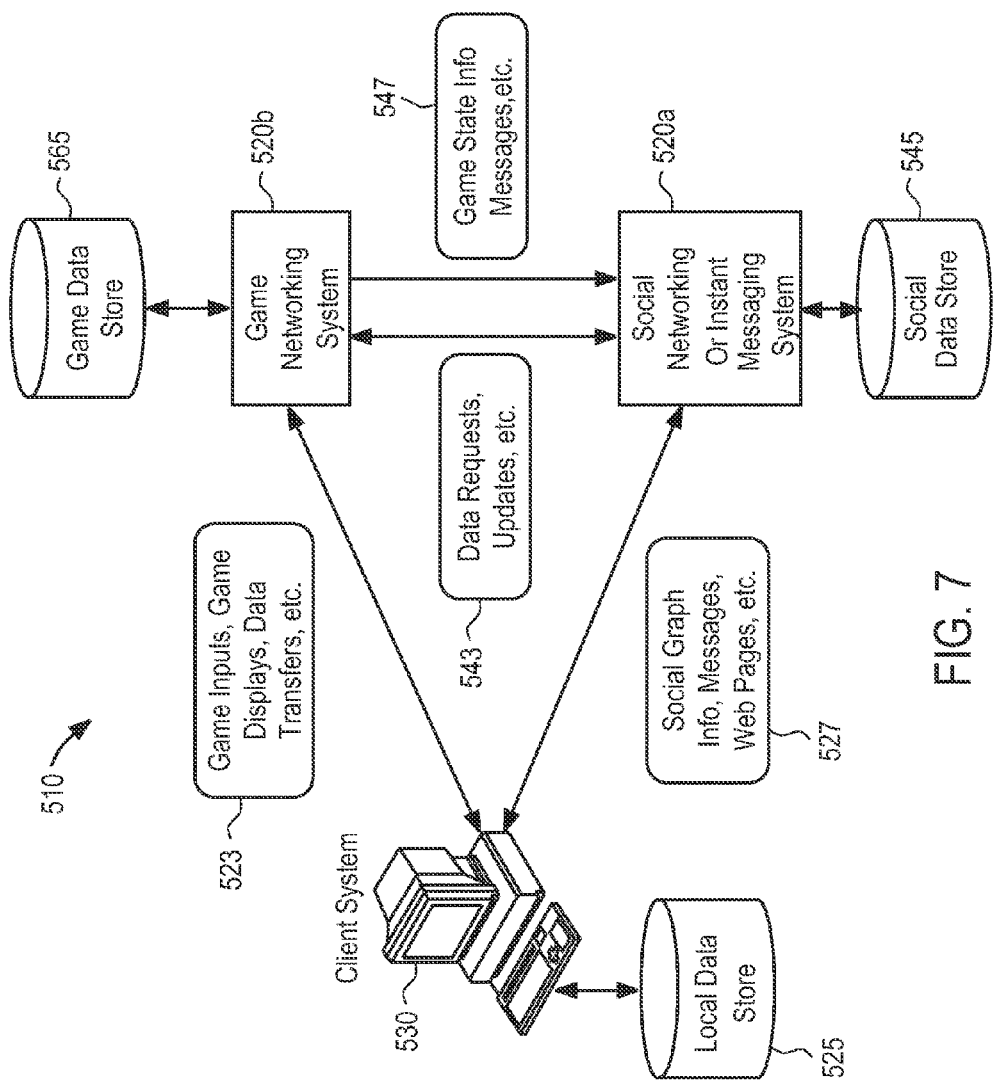
FIG. 7 is a block diagram illustrating an example data flow between the components of a system.

FIG. 7 is a block diagram illustrating an example data flow between the components of system 510. In particular embodiments, system 510 can include client system 530, social networking or instant messaging system 520a, and game networking system 520b. The components of system 510 can be connected to each other in any suitable configuration, using any suitable type of connection. The components may be connected directly or over any suitable network. Client system 530, social networking or instant messaging system 520a, and game networking system 520b can each have one or more corresponding data stores, such as local data store 525, social data store 545, and game data store 565, respectively. The social networking or instant messaging system 520a and game networking system 520b can also have one or more servers that can communicate with client system 530 over an appropriate network. The social networking or instant messaging system 520a and game networking system 520b can have, for example, one or more internet servers for communicating with client system 530 via the Internet. Similarly, social networking system or instant messaging system 520a and game networking system 520b can have one or more mobile servers for communicating with client system 530 via a mobile network GSM, PCS, Wi-Fi, WPAN, etc.). In some embodiments, one server may be able to communicate with client system 530 over both the Internet and a mobile network. In other embodiments, separate servers can be used.

Client system 530 can receive and transmit data 523 to and from game networking system 520b. This data can include, for example, web pages, messages, game inputs, game displays, HTTP packets, data requests, transaction information, updates, and other suitable data. At some other time, or at the same time, game networking system 520b can communicate data 543, 547 (e.g., game state information, game system account information, page info, messages, data requests, updates, etc.) with other networking systems, such as social networking or instant messaging system 520a (e.g., Facebook, Myspace, AIM, Yahoo! Messenger, Windows Live Messenger, etc.). Client system 530 can also receive and transmit data 527 to and from social networking or instant messaging system 520a. This data can include, for example, web pages, messages, social graph information, social network displays, HTTP packets, data requests, transaction information, updates, and other suitable data.

Communication between client system 530, social networking or instant messaging system 520a, and game networking system 520b can occur over any appropriate electronic communication medium or network using any suitable communications protocols. For example, client system 530, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as HTTP and other communications protocols, such as HTTP-S, FTP, SNMP, and TELNET, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 520b, the BLOB containing the game state for the instance corresponding to the player can be transmitted to client system 530 for use by a client-side executed object to process. In particular embodiments, the client-side executable may be a Flash-based game, which can de-serialize the game state data in the BLOB. As a player plays the game, the game logic implemented at client system 530 maintains and modifies the various game state parameters locally. The client-side game logic may also batch game events, such as mouse clicks, and transmit these events to game networking system 520b. Game networking system 520b may itself operate by retrieving a copy of the BLOB from a database or an intermediate memory cache (memcache) layer. Game networking system 520b can also de-serialize the BLOB to resolve the game state parameters and execute its own game logic based on the events in the batch file of events transmitted by the client to synchronize the game state on the server side. Game networking system 520b may then re-serialize the game state, now modified, into a BLOB and pass this to a memory cache layer for lazy updates to a persistent database.

With a client-server environment in which the online games may run, one server system, such as game networking system 520b, may support multiple client systems 530. At any given time, there may be multiple players at multiple client systems 530 all playing the same online game. In practice, the number of players playing the same game at the same time may be very large. As the game progresses with each player, multiple players may provide different inputs to the online game at their respective client systems 530, and multiple client systems 530 may transmit multiple player inputs and/or game events to game networking system 520b for further processing. In addition, multiple client systems 530 may transmit other types of application data to game networking system 520b.

In particular embodiments, a computed-implemented game may be a text-based or turn-based game implemented as a series of web pages that are generated after a player selects one or more actions to perform. The web pages may be displayed in a browser client executed on client system 530. As an example and not by way of limitation, a client application downloaded to client system 530 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking or instant messaging system 520a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 530, either caused by an action of a game player or by the game logic itself, client system 530 may need to inform game networking system 520b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 510 is discussed in reference to updating a multi-player online game hosted on a network-addressable system (such as, for example, social networking or instant messaging system 520a or game networking system 520b), where an instance of the online game is executed remotely on a client system 530, which then transmits application event data to the hosting system such that the remote game server synchronizes the game state associated with the instance executed by the client system 530.

In a particular embodiment, one or more objects of a game may be represented as an Adobe Flash object. Flash may manipulate vector and raster graphics and support bidirectional streaming of audio and video. "Flash" may mean the authoring environment, the player, or the application files. In particular embodiments, client system 530 may include a Flash client. The Flash client may be configured to receive and run Flash applications or game object codes from any suitable networking system (such as, for example, social networking or instant messaging system 520*a* or game networking system 520*b*). In particular embodiments, the Flash client may be run in a browser client executed on client system 530. A player can interact with Flash objects using client system 530 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the in-game object and the Flash object shown to the player at client system 530, the Flash client may send the events that caused the game state changes to the in-game object to game networking system 520*b*. However, to expedite the processing and hence the speed of the overall gaming experience, the Flash client may collect a batch of some number of events or updates into a batch file. The number of events or updates may be determined by the Flash client dynamically or determined by game networking system 520*b* based on server loads or other factors. For example, client system 530 my send a batch file to game networking system 520*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 530. In particular embodiments, the batch file may be a text file and the name-value pairs may be in string format.

In particular embodiments, when a player plays an online game on client system 530, game networking system 520*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, white a player is not playing the online game, the corresponding BLOB may be stored in the database. This enables a player to stop playing the game at any time without losing the current state of the game the player is in. When a player resumes playing the game next time, game networking system 520*b* may retrieve the corresponding BLOB from the database to determine the most-recent values of the game-related data. In particular embodiments, while a player is playing the online game, game networking system 520*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Particular embodiments may operate in a WAN environment, such as the Internet, including multiple network addressable systems. FIG. 8 is a block diagram illustrating an example network environment 610, in which various example embodiments may operate. Network cloud 660 generally represents one or more interconnected networks, over which the systems and hosts described herein can communicate. Network cloud 660 may include packet-based WANs (such as the Internet), private networks, wireless networks, satellite networks, cellular networks, paging networks, and the like. As FIG. 8 illustrates, particular embodiments may operate in a network environment comprising one or more networking systems, such as social networking system 620*a*, game networking system 620*b*, instant messaging system 620*c*, and one or more client systems 630. The components of social networking system 620*a*, game networking system 620*b*, and instant messaging system 620*c* operate analogously; as such, hereinafter they may be referred to simply as networking system 620. Client systems 630 are operably connected to the network environment via a network service provider, a wireless carrier, or any other suitable means.

Networking system 620 is a network addressable system that, in various example embodiments, comprises one or more physical servers 622 and data stores 624. The one or more physical servers 622 are operably connected to computer network 660 via, by way of example, a set of routers and/or networking switches 626. In an example embodiment, the functionality hosted by the one or more physical servers 622 may include web or HTTP servers, FTP servers, and application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 622 may host functionality directed to the operations of networking system 620. Hereinafter servers 622 may be referred to as server 622, although server 622 may include numerous servers hosting, for example, networking system 620, as well as other content distribution servers, data stores, and databases. Data store 624 may store content and data relating to, and enabling, operation of networking system 620 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 624 corresponds to one or more of a variety of separate and integrated databases, such as relational databases and object-oriented databases, that maintain information as an integrated collection of logically related records or files stored on one or more physical systems. Structurally, data store 624 may generally include one or more of a large class of data storage and management systems. In particular embodiments, data store 624 may be implemented by any suitable physical system(s) including components, such as one or more database servers, mass storage media, media library systems, storage area networks, data storage clouds, and the like. In one example embodiment, data store 624 includes one or more servers, databases (e.g., MySQL), and/or data warehouses. Data store 624 may include data associated with different networking system 620 users and/or client systems 630.

Client system 630 is generally a computer or computing device including functionality for communicating (e.g., remotely) over a computer network. Client system 630 may be a desktop computer, laptop computer, personal digital assistant (PDA), in- or out-of-car navigation system, smart phone or other cellular or mobile phone, or mobile gaming device, among other suitable computing devices. Client system 630 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 630 to enter addresses of specific network resources to be retrieved, such as resources hosted by networking system 620. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 630 desires to view a particular web page (hereinafter also referred to as a target structured document) hosted by networking system 620, the user's web browser, or other document rendering engine or suitable client application, formulates and transmits a request to networking system 620. The request generally includes a URL or other document identifier as well as metadata or other information. By way of example, the request may include information identifying the user, such as a user ID, as well as information identifying or characterizing the web browser or operating system running on the user's client computing device 630. The request may also include location information identifying a geographic location of the user's client system or a logical network location of the user's client system. The request may also include a timestamp identifying when the request was transmitted.

Although the example network environment 610 described above and illustrated in FIG. 8 is described with respect to social networking system 620*a* and game networking system 620*b*, this disclosure encompasses any suitable network environment using any suitable systems. As an example and not by way of limitation, the network environment may include online media systems, online reviewing systems, online search engines, online advertising systems, or any combination of two or more such systems.

Figure 9:
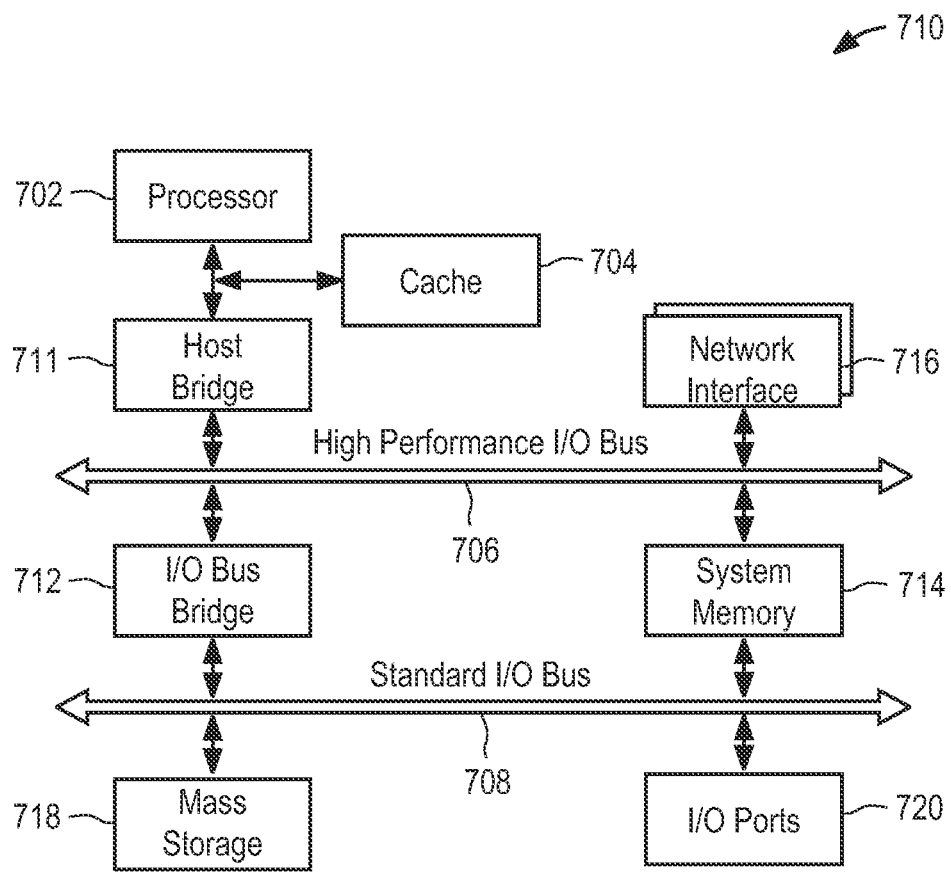
FIG. 9 is a block diagram illustrating an example computing system architecture, which may be used to implement a server or a client system.

FIG. 9 is a block diagram illustrating an example computing system architecture, which may be used to implement a server 622 or a client system 630. In one embodiment, hardware system 710 comprises a processor 702, a cache memory 704, and one or more executable modules and drivers, stored on a tangible computer readable medium, directed to the functions described herein. Additionally, hardware system 710 may include a high performance input/output (I/O) bus 706 and a standard I/O bus 708. A host bridge 711 may couple processor 702 to high performance I/O bus 706, whereas I/O bus bridge 712 couples the two buses 706 and 708 to each other. A system memory 714 and one or more network/communication interfaces 716 may couple to bus 706. Hardware system 710 may further include video memory (not shown) and a display device coupled to the video memory. Mass storage 718 and I/O ports 720 may couple to bus 708. Hardware system 710 may optionally include a keyboard, a pointing device, and a display device (not shown) coupled to bus 708. Collectively, these elements are intended to represent a broad category of computer hardware systems, including but not limited to, general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 710 are described in greater detail below. In particular, network interface 716 provides communication between hardware system 710 and any of a wide range of networks, such as an Ethernet (e.g., IEEE 802.3) network, a backplane, and so forth. Mass storage 718 provides permanent storage for the data and programming instructions to perform the above-described functions implemented in servers 622, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 710.

Hardware system 710 may include a variety of system architectures, and various components of hardware system 710 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 710 being coupled to the single bus. Furthermore, hardware system 710 may include additional components, such as additional processors, storage devices, or memories.

An operating system manages and controls the operation of hardware system 710, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit (ASIC). Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a," "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
accessing an instant messaging system from a game networking system to send an out-of-band instant message to a friend of a user of the game networking system on behalf of the user, wherein the accessing is performed by a machine associated with the game networking system;
selecting the out-of-band instant message from a plurality of messages generated by the game networking system based on a level of urgency of the out-of-band instant message, one or more of the plurality of messages being transmittable as different message types based on levels of urgency of each of the plurality of messages; and
sending the out-of-band instant message to the friend of the user of the game networking system on behalf of the user, the out-of-band instant message including a request that the friend of the user perform an action with respect to a game executing on the game networking system in response to an action performed by the user with respect to the game.

2. The method of claim 1, wherein the out-of-band instant message includes information pertaining to an action of the user with respect to a computer-implemented game executing on the game networking system.

3. The method of claim 1, wherein the out-of-band instant message includes information pertaining to an incentive to be provided to the friend based on an accessing of the game networking system by the friend.

4. The method of claim 1, wherein the sending of the out-of-band instant message to the friend is based on a determination that the friend is an additional user of the game networking system.

5. The method of claim 1, wherein the sending of the out-of-band instant message to the friend is based on a determination that the friend is a friend of the user with respect to the game networking system.

6. The method of claim 4, wherein the sending of the out-of-band instant message is based on an amount of time since the friend last accessed the game networking system.

7. A non-transitory machine-readable storage medium embodying a set of instructions that, when executed by a processor, cause the processor to perform operations, the operations comprising:
accessing an instant messaging system from a game networking system to send an out-of-band instant message to a friend of a user of the game networking system on behalf of the user;
selecting the out-of-band instant message from a plurality of messages generated by the game networking system based on a level of urgency of the out-of-band instant message, one or more of the plurality of messages being transmittable as different message types based on levels of urgency of each of the plurality of messages; and sending the out-of-band instant message to the friend of the user of the game networking system on behalf of the user, the out-of-band instant message including a request that the friend of the user perform an action with respect to a game executing on the game networking system in response to an action performed by the user with respect to the game.

8. The non-transitory machine-readable storage medium of claim 7, wherein the out-of-band instant message includes information pertaining to an action of the user with respect to a computer-implemented game executing on the game networking system.

9. The non-transitory machine-readable storage medium of claim 7, wherein the out-of-band instant message includes information pertaining to an incentive to be provided to the friend based on an accessing of the game networking system by the friend.

10. The non-transitory machine-readable storage medium of claim 7, wherein the sending of the out-of-band instant message to the friend is based on a determination that the friend is an additional user of the game networking system.

11. The non-transitory machine-readable storage medium of claim 7, wherein the sending of the out-of-band instant message to the friend is based on a determination that the friend is a friend of the user with respect to the game networking system.

12. The non-transitory machine-readable storage medium of claim 10, wherein the sending of the out-of-band instant message is based on an amount of time since the friend last accessed the game networking system.

13. A system comprising:

a processor operatively coupled to a memory; and an instant-messaging module implemented by the processor based on instructions stored in the memory, the instant-messaging module configured to access an instant messaging system from a game networking system to send an out-of-band instant message to a friend of a user of the game networking system on behalf of the user, select the out-of-band instant message from a plurality of messages generated by the game networking system based on a level of urgency of the out-of-band instant message, one or more of the plurality of messages being transmittable as different message types based on levels of urgency of each of the plurality of messages, and send the out-of-band instant message to the friend of the user of the game networking system on behalf of the user, the out-of-band instant message including a request that the friend of the user perform an action with respect to a game executing on the game networking system in response to an action performed by the user with respect to the game.

14. The system of claim 13, wherein the out-of-band instant message includes information pertaining to an action of the user with respect to a computer-implemented game executing on the game networking system.

15. The system of claim 13, wherein the out-of-band instant message includes information pertaining to an incentive to be provided to the friend based on an accessing of the game networking system by the friend.

16. The system of claim 13, wherein the instant-messaging module is configured to send the out-of-band instant message to the friend based on a determination that the friend is an additional user of the game networking system.

17. The system of claim 13, wherein the instant-messaging module is configured to send the out-of-band instant message to the friend based on a determination that the friend is a friend of the user with respect to the game networking system.

18. The system of claim 16, wherein the instant-messaging module is configured to send the out-of-band instant message based on an amount of time since the friend last accessed the game networking system.

19. The system of claim 13, wherein the instant-messaging module is configured to determine a strength of a relationship between the user and the friend, and wherein the instant-messaging module is configured to send the out-of-band instant message based on the strength of the relationship.

20. The system of claim 19, wherein the instant-messaging module is configured to determine the strength of the relationship by accessing information about the friend from a plurality of systems, including an instant messaging system and a social networking system.

* * * * *

UNITED STATES PATENT AND TRADEMARK OFFICE
CERTIFICATE OF CORRECTION

PATENT NO. : 8,812,600 B1
APPLICATION NO. : 13/077722
DATED : August 19, 2014
INVENTOR(S) : McGuirk et al.

It is certified that error appears in the above-identified patent and that said Letters Patent is hereby corrected as shown below:

In the Specification

In column 5, line 30, delete "anon" and insert --a non--, therefor

In column 6, line 48, before "user,", insert --(e.g., individuals,--, therefor

In column 8, line 16, after "connected", insert --to--, therefor

In column 8, line 21, after "character", insert --)--, therefor

In column 9, line 6, before "health", insert --(e.g.,--, therefor

In column 12, line 25, before "with", insert --(e.g.,--, therefor

In column 14, line 56, before "GSM", insert --(e.g.,--, therefor

In column 17, line 35, delete "my" and insert --may--, therefor

In column 18, line 2, delete "white" and insert --while--, therefor

In column 19, line 60, before "webpage", insert --a--, therefor

Signed and Sealed this
Seventeenth Day of March, 2015

Michelle K. Lee
*Director of the United States Patent and Trademark Office*